(12) United States Patent
Lee et al.

(10) Patent No.: US 8,379,148 B2
(45) Date of Patent: Feb. 19, 2013

(54) DIGITAL BROADCASTING TRANSMITTER, DIGITAL BROADCASTING RECEIVER, AND METHODS THEREOF

(75) Inventors: June-hee Lee, Seongnam-si (KR); Jae-moon Jo, Seongnam-si (KR); Jung-pil Yu, Suwon-si (KR); Hae-joo Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 693 days.

(21) Appl. No.: 12/403,677

(22) Filed: Mar. 13, 2009

(65) Prior Publication Data

US 2009/0284653 A1    Nov. 19, 2009

(30) Foreign Application Priority Data

May 13, 2008    (KR) .......................... 10-2008-0043922

(51) Int. Cl.
 *H04N 5/45* (2011.01)
(52) U.S. Cl. ...................................... 348/462
(58) Field of Classification Search .................. 348/462, 348/725, 723, 726–729, 553
See application file for complete search history.

(56) References Cited

U.S. PATENT DOCUMENTS

| | | | | |
|---|---|---|---|---|
| 5,742,599 A * | 4/1998 | Lin et al. | .................. | 370/395.65 |
| 7,084,898 B1 * | 8/2006 | Firestone et al. | .......... | 348/14.09 |
| 7,266,288 B2 * | 9/2007 | Tsurui et al. | .................. | 386/248 |
| 7,486,874 B2 * | 2/2009 | Yamauchi | ..................... | 386/330 |
| 7,502,073 B2 * | 3/2009 | Umesako | ....................... | 348/555 |
| 7,848,930 B2 * | 12/2010 | Luu | ................. | 704/500 |
| 7,913,273 B2 * | 3/2011 | Del Beccaro et al. | .......... | 725/31 |
| 2003/0197732 A1 * | 10/2003 | Gupta | ........................... | 345/764 |
| 2006/0248559 A1 * | 11/2006 | Michener et al. | ............... | 725/67 |
| 2008/0320525 A1 * | 12/2008 | Smith et al. | ..................... | 725/61 |
| 2009/0103886 A1 * | 4/2009 | Kataoka | ............................ | 386/52 |
| 2009/0284653 A1 * | 11/2009 | Lee et al. | .................... | 348/462 |
| 2010/0067877 A1 * | 3/2010 | Ichimura et al. | ................ | 386/96 |
| 2010/0100923 A1 * | 4/2010 | Toiyama | ...................... | 725/131 |
| 2010/0215344 A1 * | 8/2010 | Kato | .............................. | 386/95 |

FOREIGN PATENT DOCUMENTS

| | | |
|---|---|---|
| JP | 2005020312 | 1/2005 |
| JP | 2005167687 | 6/2005 |
| JP | 2006352663 | 12/2006 |
| KR | 1020010023607 | 3/2001 |

OTHER PUBLICATIONS

International Search Report and Written Opinion dated Nov. 17, 2009 issued in corresponding application No. PCT/KR2009/001815.

* cited by examiner

*Primary Examiner* — Paulos M Natnael
(74) *Attorney, Agent, or Firm* — Sughrue Mion, PLLC

(57) ABSTRACT

A digital broadcasting transmitter, digital broadcasting transmission method, digital broadcasting receiver, and digital broadcasting reception method are provided. The digital broadcasting transmitter includes: an input unit to receive corresponding audio data and video data; and a signal processing unit to individually construct a first type stream having the audio and the video data, and a second type stream having the audio data different in broadcast time from the audio and the video data in the first type stream, and to output the first type stream and the second type stream. Therefore, it is possible to reduce user inconvenience caused by a broadcast being disconnected.

16 Claims, 6 Drawing Sheets

| TS1 | Header | A0&V0 | A1 |
| TS2 | Header | A1&V1 | A2 |
| TS3 | Header | A2&V2 | A3 |
| TS4 | Header | A3&V3 | A4 |

DIGITAL BROADCASTING TRANSMITTER, DIGITAL BROADCASTING RECEIVER, AND METHODS THEREOF

CROSS-REFERENCE TO RELATED APPLICATION

This application claims the benefit of Korean Patent Application No. 2008-43922, filed May 13, 2008 in the Korean Intellectual Property Office, the disclosure of which is incorporated herein by reference.

BACKGROUND OF THE INVENTION

1. Field of the Invention

Aspects of the present invention relate to a digital broadcasting transmitter, a digital broadcasting receiver, and methods thereof, and more particularly, to a digital broadcasting transmitter, a digital broadcasting receiver and methods thereof to output only audio data when normal broadcasting is impossible.

2. Description of the Related Art

Developments in digital technologies promote the widespread use of digital video processing systems, such as digital televisions. Accordingly, various digital broadcasting standards have been proposed in order to provide general homes with digital broadcasting data when digital streams are transmitted.

Digital broadcasting has various advantages, including providing high quality broadcasting and the ability to transmit a wide variety of information due to a radio wave transmission efficiency greater than that of analog broadcasting. However, if transport streams are broken by peripheral magnetic fields or by obstacles, the digital broadcasting may be disconnected. This problem may occur more frequently when broadcasts are provided to viewers in moving vehicles.

Conventionally, playback of video and audio is interrupted or degraded for a broadcast time corresponding to a broken transport stream. Accordingly, viewing quality is reduced, so viewers may feel discontent while watching digital broadcasts.

SUMMARY OF THE INVENTION

Aspects of the present invention relate to a digital broadcasting transmitter, digital broadcasting receiver, and methods thereof, in which, when a transport stream is broken, only audio data corresponding to the broken transport stream is output so that it is possible to minimize user dissatisfaction.

According to an aspect of the present invention, there is provided a digital broadcasting transmitter including: an input unit to receive corresponding audio data and video data; and a signal processing unit to individually construct a first type stream comprising the audio data and the video data, and a second type stream comprising the audio data different in broadcast time from the audio data and the video data in the first type stream, and to output the first type stream and the second type stream.

According to an aspect of the present invention, the signal processing unit may construct the second type stream to contain audio data to be output corresponding to a broadcast segment that is a predetermined number of segments before a broadcast segment corresponding to the audio and video data in the first type stream.

According to an aspect of the present invention, the predetermined number of segments may be decided according to the convenience of the designer, or the audio data of the second type stream may correspond to a broadcast segment next to the broadcast segment of the first type stream.

According to an aspect of the present invention, the signal processing unit may combine the first type stream and the second type stream in a single composite transport stream for every preset broadcast segment, and output the single composite transport stream.

According to an aspect of the present invention, the signal processing unit may record stream information to classify the first type stream and the second type stream on a packet header within the single composite transport stream.

According to another aspect of the present invention, there is provided a digital broadcasting transmission method including: receiving corresponding audio data and video data; and individually constructing a first type stream comprising the audio data and the video data, and a second type stream comprising the audio data different in broadcast time from the audio data and the video data in the first type stream, and outputting the first type stream and the second type stream.

According to an aspect of the present invention, the constructing and outputting of the first type stream and the second type stream may include constructing the second type stream to contain audio data to be output corresponding to a broadcast segment that is a predetermined number of segments before a broadcast segment corresponding to the audio and video data in the first type stream.

According to an aspect of the present invention, the predetermined number of segments may be decided according to a convenience of the designer, or the audio data of the second type stream may correspond to a broadcast segment next to the broadcast segment of the first type stream.

According to an aspect of the present invention, the constructing and outputting of the first type stream and the second type stream may include combining the first type stream and the second type stream in a single composite transport stream for every preset broadcast segment, and outputting the single composite transport stream.

According to an aspect of the present invention, the constructing and outputting of the first type stream and the second type stream may further include recording stream information to classify the first type stream and the second type stream on a packet header within the single composite transport stream.

According to another aspect of the present invention, there is provided a digital broadcasting receiver including: a receiving unit to receive a transport stream including a first type stream comprising corresponding audio data and video data, and a second type stream comprising the audio data different in broadcast time from the audio data and the video data in the first type stream; and a broadcast output unit to selectively process the first type stream or the second type stream and to output the processed stream.

According to an aspect of the present invention, if it is possible to normally output the audio data and the video data in the first type stream, the broadcast output unit may process the first type stream as a default; or if it is impossible to normally output the audio data and the video data in the first type stream, the broadcast output unit may process the second type stream and output the audio data in the second type stream.

According to an aspect of the present invention, the broadcast output unit may include a storage unit to store the audio data contained in the second type stream; a reception signal processor to process the audio data and the video data contained in the first type stream individually, and to output the processed data; and a control unit to control the reception signal processor to process the audio data stored in the storage unit and to output the processed data, if it is impossible to normally output the audio data and the video data in the first type stream.

According to an aspect of the present invention, the control unit may check a level of noise contained in the first type stream and determine whether it is possible to normally output the audio data and the video data in the first type stream.

According to an aspect of the present invention, the receiving unit may include a tuner to receive the transport stream; and a demodulator to demodulate the received transport stream and to transfer the first type stream and the second type stream to the reception signal processor and the storage unit, respectively.

According to an aspect of the present invention, if an audio-video mode is set, the broadcast output unit may process the first type stream and output the audio data and the video data in the first type stream; and if an audio mode is set, the broadcast output unit may process the second type stream and output the audio data in the second type stream.

According to an aspect of the present invention, the transport stream may include the first type stream and the second type stream having the audio data to be output corresponding to a broadcast segment that is a predetermined number of segments before a broadcast segment corresponding to the audio data and the video data in the first type stream.

According to an aspect of the present invention, the predetermined number of segments may be decided according to a convenience of the designer, or the audio data of the second type stream may correspond to a broadcast segment next to the broadcast segment of the first type stream.

According to an aspect of the present invention, the transport stream may be constructed by combining the first type stream and the second type stream in a composite form for every preset broadcast segment.

According to an aspect of the present invention, the demodulator may check stream information to classify the first type stream and the second type stream from a packet header within the transport stream, may detect the first type stream and the second type stream separately using the stream information, and may demodulate the detected first type stream and the detected second type stream.

According to another aspect of the present invention, there is provided a digital broadcasting reception method including: receiving a transport stream including a first type stream comprising audio data and video data, and a second type stream comprising the audio data different in broadcast time from the audio data and the video data in the first type stream; and selectively processing the first type stream or the second type stream and outputting the processed stream.

According to an aspect of the present invention, the processing and outputting of the stream may include processing the first type stream to be a default, if it is possible to normally output the audio data and the video data in the first type stream; and processing the second type stream and outputting the audio data in the second type stream, if it is impossible to normally output the audio data and the video data in the first type stream.

According to an aspect of the present invention, the processing and outputting of the stream may include: storing the audio data contained in the second type stream; determining whether it is possible to normally output the audio data and the video data in the first type stream; and processing the audio data and the video data contained in the first type stream individually and outputting the processed data if it is determined that it is possible to normally output the audio data and the video data in the first type stream, and processing the stored audio data and outputting the processed data if it is determined that it is impossible to normally output the audio data and the video data in the first type stream.

According to an aspect of the present invention, the determining of whether it is possible to normally output may include checking a level of noise contained in the first type stream and determining whether it is possible to normally output the audio data and the video data in the first type stream.

According to an aspect of the present invention, the processing and outputting of the stream may include processing the first type stream and outputting the audio data and the video data in the first type stream, if an audio-video mode is set; and processing the second type stream and outputting the audio data in the second type stream, if an audio mode is set.

According to an aspect of the present invention, the transport stream may include the first type stream and the second type stream having audio data to be output corresponding to a broadcast segment that is a predetermined number of segments before a broadcast segment corresponding to the audio data and the video data in the first type stream.

According to an aspect of the present invention, the predetermined number of segments may be decided according to a convenience of the designer, or the audio data of the second type stream may correspond to a broadcast segment next to the broadcast segment of the first type stream.

According to an aspect of the present invention, the transport stream may be constructed by combining the first type stream and the second type stream in a composite form for every preset broadcast segment.

The digital broadcasting reception method may further include detecting, from the first type stream, audio data and video data corresponding to a broadcast segment following a broadcast segment corresponding to the stored audio data, and outputting the detected audio data and the detected video data, if playback of the broadcast segment corresponding to the stored audio data is finished.

According to another aspect of the present invention, there is provided a digital broadcasting system including: a digital broadcasting transmitter to transmit digital audio and video data, the digital broadcasting transmitter including: an input unit to receive corresponding audio data and video data, and a signal processing unit to individually construct a first type stream comprising the audio data and the video data, and a second type stream comprising the audio data different in broadcast time from the audio data and the video data in the first type stream, and to transmit the first type stream and the second type stream; and a digital broadcasting receiver including: a receiving unit to receive the transmitted first type stream and the transmitted second type stream, and a broadcast output unit to selectively process the first type stream or the second type stream and to output the processed stream.

According to another aspect of the present invention, there is provided a digital broadcasting method including: receiving corresponding audio data and video data; individually constructing a first type stream comprising the audio data and the video data, and a second type stream comprising the audio data different in broadcast time from the audio data and the video data in the first type stream; transmitting the first type stream and the second type stream; receiving the transmitted first type stream and the transmitted second type stream; and selectively processing the first type stream or the second type stream and outputting the processed stream.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
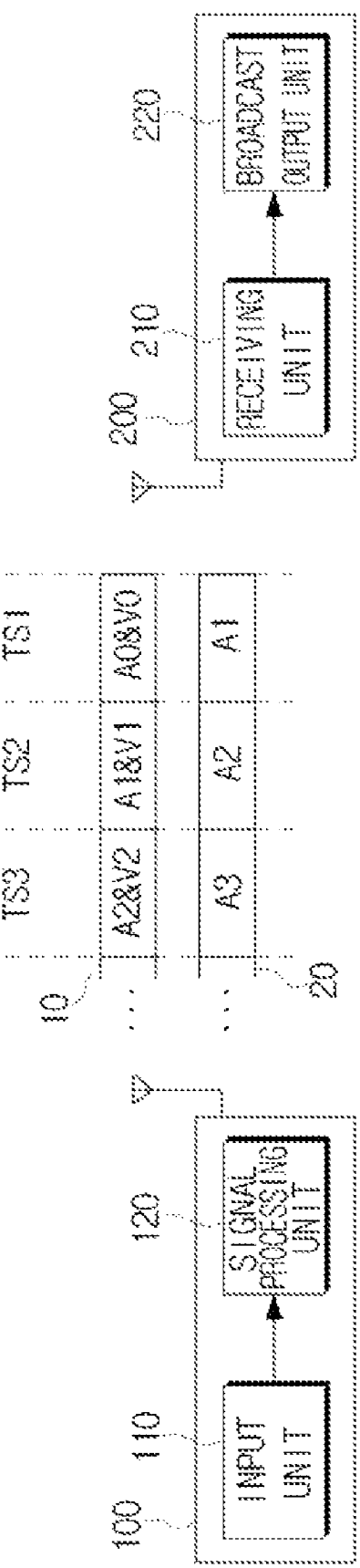
FIG. 1 exemplarily depicts a digital broadcasting system including a digital broadcasting transmitter and a digital broadcasting receiver according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 exemplarily depicts a digital broadcasting system according to an embodiment of the present invention. Referring to FIG. 1, the digital broadcasting system includes a digital broadcasting transmitter 110 and a digital broadcasting receiver 200. The digital broadcasting transmitter 110 generates transport streams for digital broadcasting, and transmits the generated transport streams to the digital broadcasting receiver 200 via one or more channels. To achieve this, the digital broadcasting transmitter 100 includes an input unit 110 and a signal processing unit 120.

The input unit 110 receives video data and/or audio data from one or more sources. For example, the input unit 110 may receive video and audio data captured by a capturing apparatus (such as a camera, a microphone, etc.) or retrieve video and/or audio stored on a recording medium.

The signal processing unit 120 constructs transport streams using the input video and audio data, and transmits the constructed transport streams via the one or more channels. In more detail, the signal processing unit 120 constructs a transport stream 10 including both video and audio data (hereinafter, referred to as a first type stream 10), and a transport stream 20 including only audio data (hereinafter, referred to as a second type stream 20) separately, so as to transmit a single composite transport stream. Video data and audio data are synchronized and output to form a single broadcasting signal. In other words, when frames are displayed on a screen when restored from the video data by a receiver 200, sound restored from the audio data is output through speakers so that a user is able to view a corresponding broadcast. The signal processing unit 120 may divide the first type stream 10 and second type stream 20 into their respective broadcast segments, and may transmit the first type stream 10 and second type stream 20.

In more detail, as shown in FIG. 1, the first type stream 10 and the second type stream 20 are transmitted to the digital broadcasting receiver 200. Here, each of the two type streams 10 and 20 may be divided into a plurality of stream sections TS1, TS2, TS3, . . . , TSn. The first type stream 10 may be output along with the second type stream 20, which has audio data following the audio and video data of the first type stream 10. That is, when audio and video data forming a single broadcast segment are transmitted as the first type stream 10, the signal processing unit 120 may transmit the second type stream 20 having audio data corresponding to a broadcast segment that is a predetermined number of segments before the broadcast segment of the first type stream 10. Here, the predetermined number of segments may be determined according to the convenience of the designer, or the audio data of the second type stream 20 may correspond to a broadcast segment next to the broadcast segment of the first type stream 10. For example, audio data A1 may be transmitted in stream section TS1 of the second type stream 20 and in stream section TS2 of the first type stream 10. Also, as shown in FIG. 1, audio and video data A0&V0 corresponding to segment 0 are transmitted together with audio data A1 corresponding to segment 1 next to segment 0 in stream section TS1. Additionally, A1&V1 and A2 are transmitted simultaneously in stream section TS2. Lastly, A2&V2 and A3 are transmitted simultaneously in stream section TS3.

For example, if it is possible to normally output audio and video data A1&V1 corresponding to a current broadcast segment (e.g., section TS2), the digital broadcasting receiver 200 normally processes and outputs the audio and video data A1&V1. However, if it is not possible to normally output the audio and video data A1&V1 corresponding to the current broadcast segment, the digital broadcasting receiver 200 processes only audio data A1 that has been received in previous stream section TS1 (namely, the audio data corresponding to the current broadcast segment). Thus, according to aspects of the present invention, the digital broadcasting receiver 200 outputs the processed audio data A1 in place of the audio and video data A1&V1 when a current broadcast segment is not received. While the data of the first type stream 10 and the data of the second type stream 20 are differentiated by one stream section, it is understood that aspects of the present invention are not limited thereto. For example, according to other aspects, the data of the second type stream 20 may precede the data of the first type stream 10 by two or more stream sections.

Figure 2:
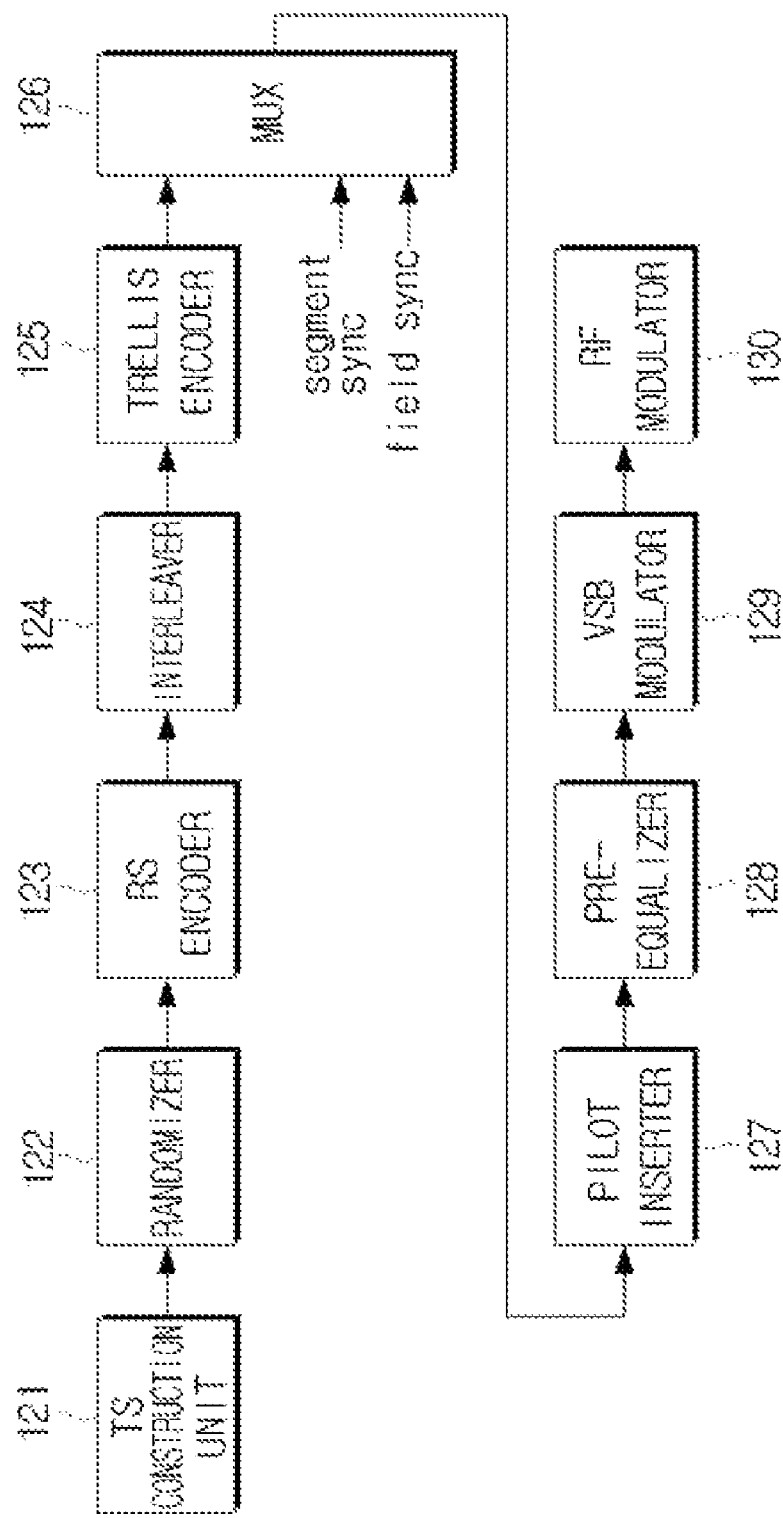
FIG. 2 is a block diagram of a digital broadcasting transmitter according to an embodiment of the present invention.

Accordingly, if the first type stream 10 is broken while broadcasting, only audio data may be output using the second type stream 20 that has already been received on a previous packet, and it is thus possible to prevent a broadcast from being temporarily interrupted. Additionally, only audio data may be provided to a user, so it is possible to avoid losing the flow of the broadcast. The digital broadcasting transmitter 100 may further include a wide variety of components. FIG. 2 depicts in detail the digital broadcasting transmitter 100 of FIG. 1, according to an embodiment of the present invention.

Referring to FIG. 2, the signal processing unit 120 is configured to include a transport stream (TS) construction unit 121, a randomizer 122, a Reed-Solomon (RS) encoder 123, an interleaver 124, a trellis encoder 125, a multiplexer (MUX) 126, a pilot inserter 127, a pre-equalizer 128, a vestigial sideband (VSB) modulator 129, and a radio frequency (RF) modulator 130.

The TS construction unit 121 constructs a transport stream (TS) using the data received by the input unit 110. According to aspects of the present invention, the constructed TS includes a first type stream 10 and a second type stream 20. Additionally, the first type stream 10 and the second type stream 20 may be data that is compressed using a predetermined compression format and in which errors are able to be corrected, or may be generally processed data. The randomizer 122 randomizes the TS, and the RS encoder 123 RS-encodes the randomized TS. The interleaver 124 interleaves the RS-encoded TS and transfers the interleaved TS to the trellis encoder 125. The trellis encoder 125 trellis-encodes the received TS. The MUX 126 inserts a field sync and a segment sync into the trellis-encoded TS, and the pre-equalizer 128 performs pre-equalizing on the TS output from the MUX 126. The VSB modulator 129 and RF modulator 130 perform VSB modulation and RF modulation, respectively.

The signal processing unit 120 may further include components other than the above-described components, or some components may be removed from the signal processing unit 120, or the order of components may vary, according to embodiments of the present invention. Additionally, the name of components may also be changed according to their respective operations.

If audio data and video data are input by the input unit 110, the signal processing unit 120 constructs the first type stream 10 using the input data, and constructs the second type stream 20 by demultiplexing the input data and detecting only the audio data from the demultiplexed data. However, it is understood that aspects of the present invention are not limited thereto. For example, according to other aspects, the audio data and video data may be separately input, such that the signal processing unit 120 constructs the first type stream 10 by multiplexing the input data, and constructs the second type stream 20 from the input audio data. Moreover, other data could be added to the stream in addition to or instead of the video and audio data, such as computer programs, game data, and interactive data.

Subsequently, the signal processing unit 120 may interleave the first type stream 10 and the second type stream 20 using the same interleaving rule. Alternatively, the signal processing unit 120 may insert the second type stream 20 into an adaptation field within a packet in which the first type stream 10 is disposed, so that the two type streams 10 and 20 may be output in the form of a composite transport stream. If the composite transport stream including both the first type stream 10 and second type stream 20 is constructed, the signal processing unit 120 may record position information to set the position of the first type stream 10 and second type stream 20 within a single packet, on the header part of the constructed transport stream.

Complying with a digital broadcasting standard, a single packet may include a total of 188 bytes, including a 1 byte sync signal, a 3 byte header, and a 184 byte payload. The TS may include various fields, such as a sync byte, a transport error indicator, a payload unit start indicator (PUSI), a transport priority, a packet identifier (PID), a transport scrambling control, an adaptation field control, a continuity counter, an adaptation field, or the like. The adaptation field includes an adaptation field length, a discontinuity indicator, an elementary stream priority indicator, a 5 flag, an optional field and a stuffing byte. The second type stream 20 may be disposed in the optional field within the adaptation field. However, this is only an example, and it is understood that the first type stream 10 and the second type stream 20 may be disposed in various forms according to other aspects.

Figures 3, 4:
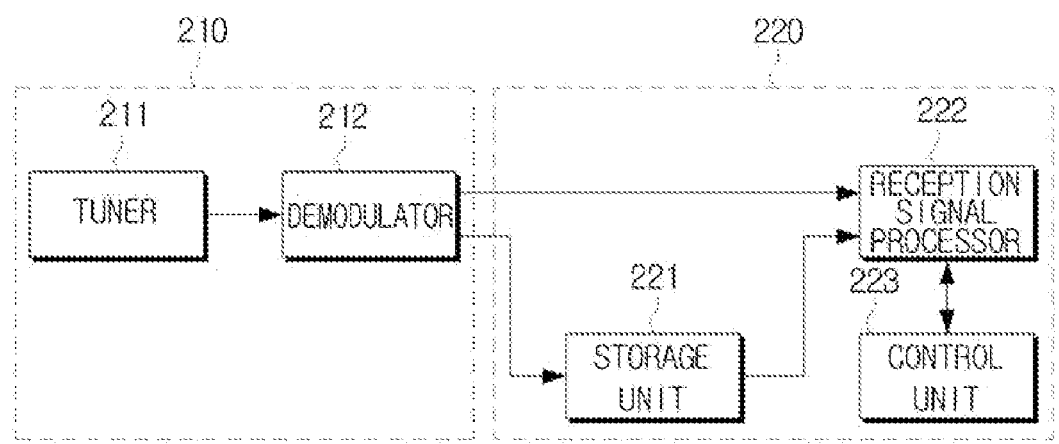
FIG. 3 exemplarily depicts transport streams that are able to be transmitted or received in the digital broadcasting system of FIG. 1.
FIG. 4 is a block diagram of a digital broadcasting receiver according to an embodiment of the present invention.

FIG. 3 exemplarily depicts transport streams in which first type streams 10 and second type streams 20 are mixed. Referring to FIG. 3, a first type stream 10 and a second type stream 20 are sequentially placed following a header part in each of the plurality of packets. The second type stream 20 contains audio data corresponding to a broadcast segment following a broadcast segment of the first type stream 10.

Referring back to FIG. 1, the digital broadcasting receiver 200 includes a receiving unit 210 and a broadcast output unit 220. The receiving unit 210 receives the TS transmitted from the digital broadcasting transmitter 100. Specifically, the receiving unit 210 receives the TS including the first type stream 10 having both audio and video data of a single broadcast signal and the second type stream 20 having only audio data that is to be output at a time different from the audio and video data of the first type stream.

The broadcast output unit 220 outputs a broadcast signal using the first type stream 10 and the second type stream 20 received by the receiving unit 210. In more detail, the broadcast output unit 220 attempts to restore the audio and video data detected from the first type stream 10, and outputs the broadcast signal using the restored data. In this situation, the broadcast output unit 220 selectively processes either the first type stream 10 or the second type stream 20, and outputs the processed stream. The selection criteria may be determined according to embodiments of the present invention. Specifically, at least one of the first type stream 10 and the second type stream 20 is selected according to whether it is possible to normally output data in the stream. Here, the first type stream 10 having both the audio and video data may be set to be a default. If it is determined that it is impossible to normally output the audio and video data of the first type stream 10 after processing the first type stream 10, the broadcast output unit 220 processes the second type stream 20, and outputs audio data in the second type stream 20 in place of the audio and video data of the first type stream 10. Accordingly, if a broadcast is output while being broken or interrupted, only sound is output.

Alternatively, a user setting mode may be used as a selection criterion. For example, if a user selects an audio-video mode, the broadcast output unit 220 selects the first type stream 10 so that both the audio and video data in the first type stream 10 are output. If the user selects an audio mode, the broadcast output unit 220 selects the second type stream 20 so that only audio data in the second type stream 20 is output. Alternatively, the audio mode many allow the broadcast output unit 220 to output only the audio of the first type stream 10 such that, if the audio cannot be normally output from the stream 10, the audio of the second type stream 20 is used.

According to another embodiment of the present invention, the digital broadcasting transmitter 100 may transmit the first type stream 10 and the second type stream 20 separately, in parallel. In this situation, the digital broadcasting receiver 200 may convert the received first type stream 10 into a broadcast signal and output the broadcast signal, while storing the second type stream 20.

FIG. 4 is a detailed block diagram of the digital broadcasting receiver 200 shown in FIG. 1. Referring to FIG. 4, the receiving unit 210 of the digital broadcasting receiver 200 includes a tuner 211 and a demodulator 212. The broadcast output unit 220 includes a storage unit 221, a reception signal processor 222, and a control unit 223. While not shown, it is understood that the receiver 200 can include or be connected to other items, such as a display or speakers. Moreover, the receiver 200 can receive user inputs through an interface and/or remote control to control the tuner 211 and/or control unit 223.

The tuner 211 tunes to a specific frequency band, and receives a TS. The demodulator 212 demodulates the TS received by the tuner 211, and transfers a first type stream 10 and a second type stream 20 of the demodulated TS to the reception signal processor 222 and the storage unit 221, respectively. The demodulator 212 may classify the TS into the first type stream 10 and the second type stream 20 by checking a header part of the TS. The reception signal processor 222 performs RS decoding, viterbi decoding, deinterleaving or the like on the first type stream 10 output from the demodulator 212, so that audio and video data are restored from the first type stream 10 and output (for example, via a screen and/or speakers (not shown)). The storage unit 221 temporarily stores the second type stream 20 output from the demodulator 212. While only the second type stream 20 is stored in the storage unit 221 as shown in FIG. 4, it is understood that the first type stream 10 may also be temporarily buffered in the storage unit 221 according to other aspects. Additionally, the storage unit 221 may further include various buffer memories or other memories used for reception and playback of streams. The storage unit 221 may be a volatile memory (such as RAM) or a non-volatile memory (such as ROM, flash memory, or a hard disk drive).

The control unit 223 controls the reception signal processor 222 to process either the first type stream 10 or the second type stream 20 selectively so that data of the processed stream 10 or 20 is output. Specifically, the control unit 223 determines whether it is possible to normally output a broadcast using the first type stream 10. In this situation, the control unit 223 may check the parity of the first type stream 10, and/or may determine whether the level of noise in the first type stream 10 exceeds a threshold value by other known noise determination processes. Additionally, the control unit 223 may determine whether it is possible to normally output data of the first type stream 10 by judging the state of the channel for transmitting the first type stream 10. When determining whether it is possible to normally output a broadcast according to the level of noise, if the level of noise falls below the threshold value, the control unit 223 controls the reception signal processor 222 to individually process the audio data and the video data contained in the first type stream 10 and output the processed data. Accordingly, if normal broadcasting is possible, the reception signal processor 222 may play back the broadcast signal using only the first type stream 10.

Conversely, if the level of noise exceeds the threshold value, the control unit 223 controls the reception signal processor 222 to process the audio data of the second type stream 20 stored in the storage unit 221 and output the processed data. Additionally, the reception signal processor 222 reads from the storage unit 221 recorded audio data of the second type stream 20 corresponding to a broadcast segment of the first type stream 10 that is currently unable to be played back, and processes the read audio data. With respect to the broadcast segment, the second type stream 20 is received prior to the first type stream, so the audio data corresponding to the broadcast segment is stored in the storage unit 221. Accordingly, sound may continue to be output even when it is impossible to output video of the currently played back broadcast, so a viewer does not lose the flow of the broadcast. According to other aspects of the present invention, if the level of noise exceeds the threshold value, the control unit 223 may control the reception signal processor 222 to still process only the video data of the first type stream 10, while processing the audio data of the second type stream 20 so that at least partial video is displayed.

According to another embodiment of the present invention, the control unit 223 may select either the first type stream 10 or the second type stream 20 according to a mode set by the user. For example, if the user sets the audio-video mode in advance, the control unit 223 processes the first type stream 10 and outputs the processed data. In contrast, if the user sets the audio mode, the control unit 223 processes the second type stream 20 and outputs the processed data. In this situation, it is unnecessary for the control unit 223 to determine whether it is possible to normally output the first type stream 10.

Additionally, the digital broadcasting receiver 200 may provide a user interface window by which a user is able to select the audio-video mode. The user interface window may be implemented as an on-screen-display (OSD) image. Accordingly, if it is difficult to view video but it is possible to listen to sound, the user may select the audio mode.

Figure 5:
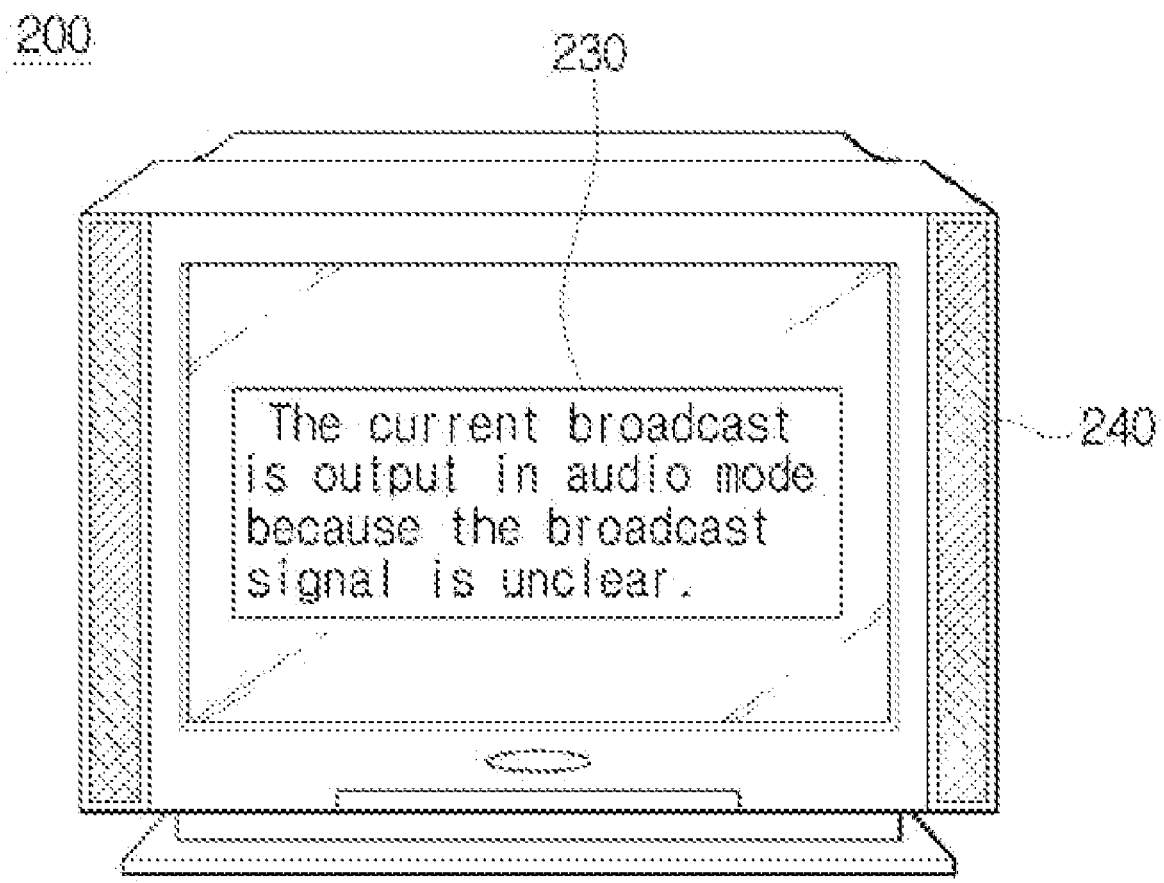
FIG. 5 exemplarily depicts an alternative output state in the digital broadcasting receiver of FIG. 4.

FIG. 5 exemplarily depicts an alternative output state in the case that the digital broadcasting receiver 200 of FIG. 4 is a television (TV). Referring to FIG. 5, the digital broadcasting receiver 200 outputs only audio data via speakers 240 when normal broadcasting is impossible or deactivated. Additionally, a notification message 230 stating that the audio-video mode is replaced with the audio mode may be displayed on a screen. The control unit 223 may display the notification message 230 on the screen using an OSD method.

Figure 6:
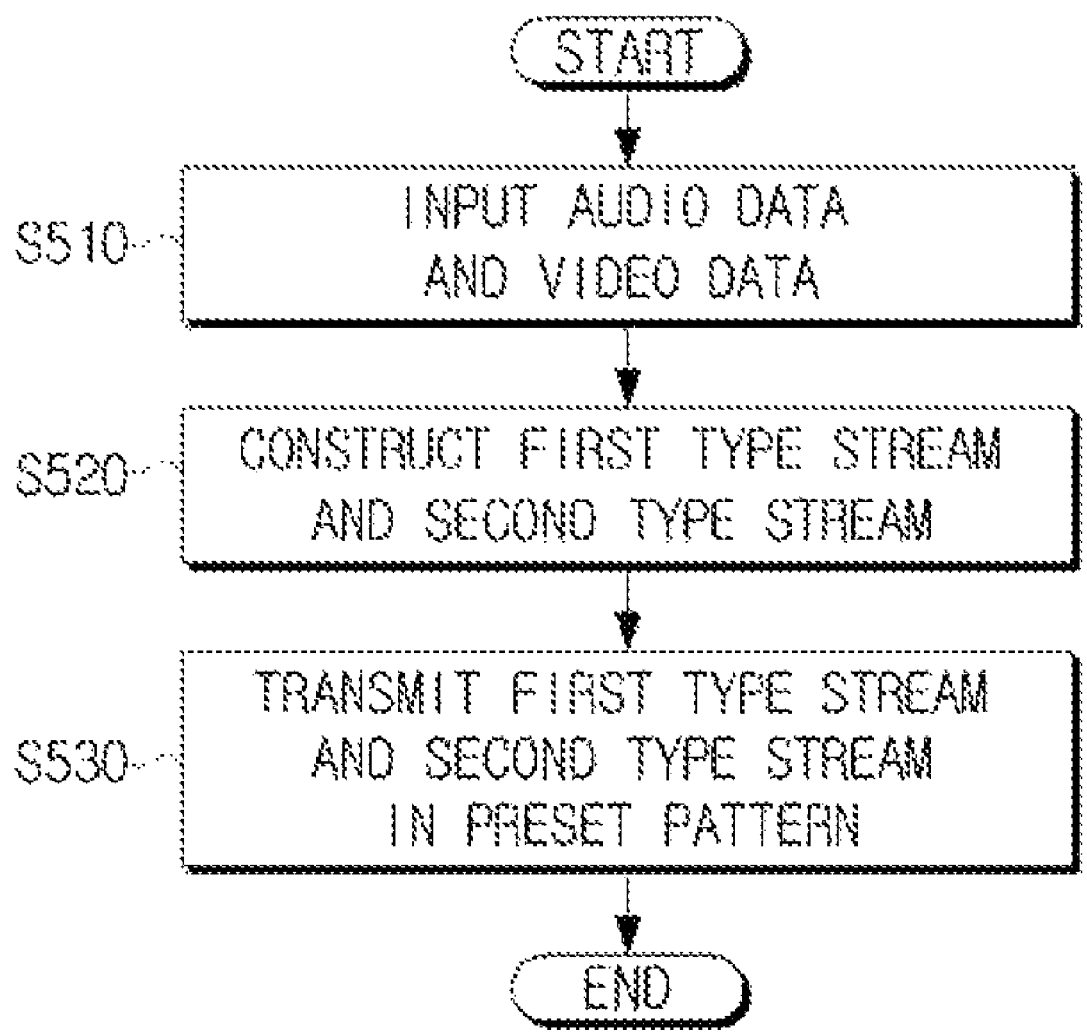
FIG. 6 is a flowchart explaining a digital broadcasting transmission method according to an embodiment of the present invention.

FIG. 6 is a flowchart explaining a digital broadcasting transmission method according to an embodiment of the present invention. Referring to FIG. 6, if audio data and video data are input in operation S510, the first type stream 10 having both the input audio and video data and the second type stream 20 having only the input audio data are constructed in operation S520. In more detail, if audio data and video data are separately input, the first type stream 10 is constructed by multiplexing the input audio and video data. Alternatively, if audio data and video data are input in composite form, the input composite data is demultiplexed and divided into the audio data and video data, and only the audio data forms the second type stream 20.

The first type stream 10 and second type stream 20 are constructed according to preset patterns, and output together in operation S530. In this situation, the second type stream 20 may be inserted into an adaptation field within a packet of the first type stream 10, so that a single composite transport stream may be output. Accordingly, the first type stream 10 and second type stream 20 may be disposed alternately. Alternatively, the first type stream 10 and second type stream 20 may be interleaved according to the preset interleaving rule, so that a single composite transport stream may be output. The output pattern of the first type stream 10 and second type stream 20 may be set by the designer. Additionally, according to other aspects, the first type stream 10 and second type stream 20 may be constructed separately, so that each stream 10 and 20 may be output in parallel. A method proposed by the well-known standards may be applied to process transport streams, so a detailed description and drawings are omitted.

Figure 7:
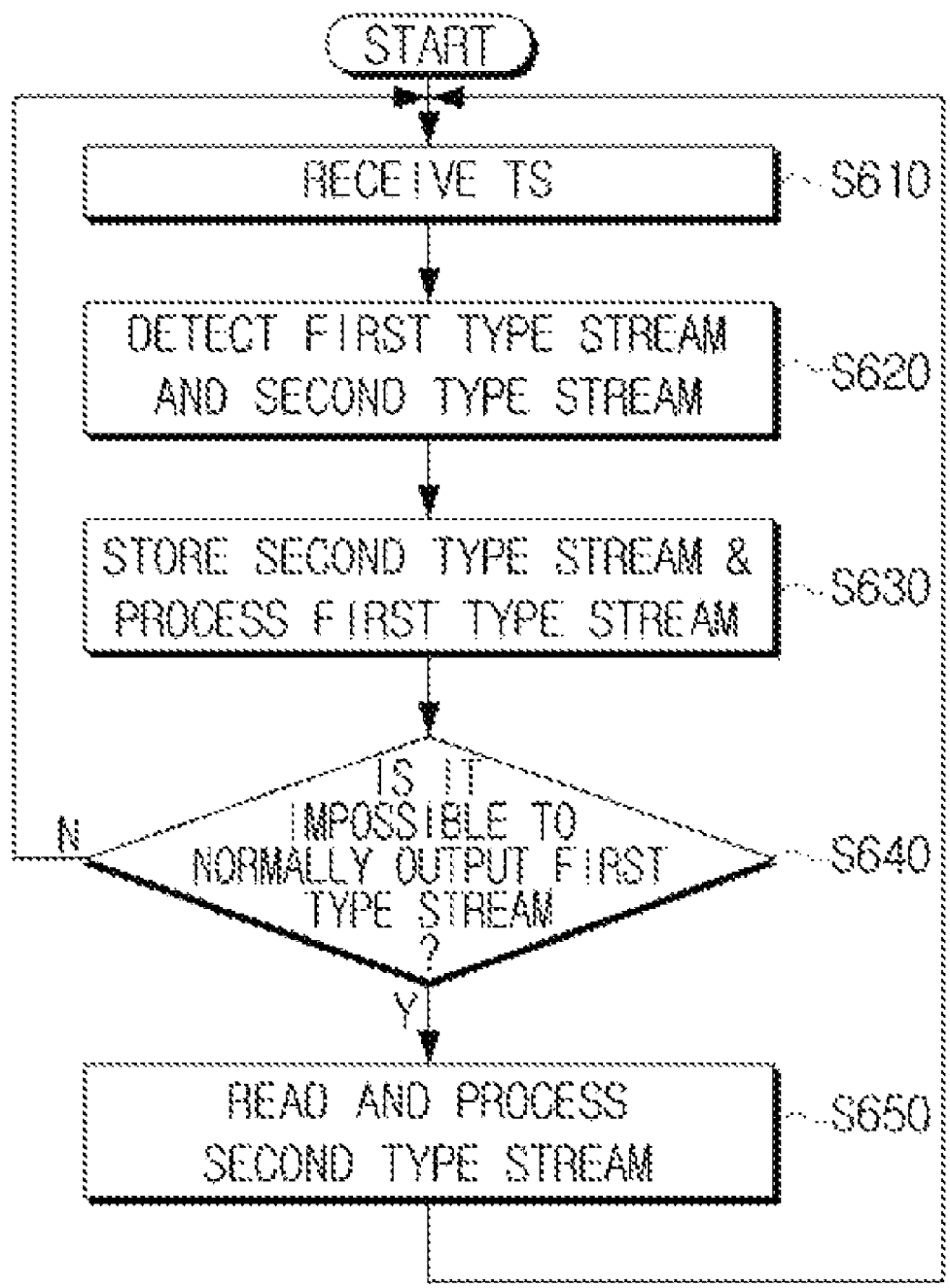
FIG. 7 is a flowchart explaining a digital broadcasting reception method according to an embodiment of the present invention.

FIG. 7 is a flowchart explaining a digital broadcasting reception method according to an embodiment of the present invention. Referring to FIG. 7, the digital broadcasting receiver 200 receives the TS via one or more channels in operation S610. The received TS includes the first type stream 10 having both audio data and video data of a single broadcast signal, and the second type stream 20 having only audio data that will be output at a time different from the audio and video data of the first type stream 10. For example, the digital broadcasting receiver 200 may receive a TS in the form shown in FIG. 3.

After receiving the TS, the digital broadcasting receiver 200 detects the first type stream 10 and second type stream 20 in operation S620. While storing the audio data in the second type stream 20, the digital broadcasting receiver 200 processes (for example, decodes, deinterleaves, equalizes, etc.) the audio data and video data in the first type stream 10 and outputs the processed audio data and processed video data (for example, through speakers and a screen, respectively, or to an external device) in operation S630.

The digital broadcasting receiver 200 determines whether it is possible to normally output the first type stream 10 in operation S640. Specifically, the digital broadcasting receiver 200 may check a segment error rate (SER) and/or a bit error rate (BER) of the first type stream 10 by comparing the SER and/or the BER to a preset threshold value.

Accordingly, if normal output is possible, only the first type stream 10 may continue to be processed and output while the second type stream 20 is stored as soon as being received. Here, the second type stream 20 may be removed after a predetermined period of time has elapsed after storing, or after corresponding audio data has been output from the first type stream 10.

Alternatively, if normal output is impossible, the digital broadcasting receiver 200 processes the second type stream corresponding to a broadcast segment of the first type stream 10 to be output, and outputs the second type stream in operation S650. As described above, audio and video data corresponding to the broadcast segment to be output are received using the first type stream 10, but the audio data corresponding to the broadcast segment is detected from the second type stream 20 that was received prior to the first type stream 10 and has been stored already. Accordingly, if it is impossible to play back video for the broadcast segment to be output, only audio data that has been received using the second type stream 20 may be output so that the user can listen to the audio broadcast.

If the playback of the broadcast segment is finished, the audio broadcast may also be stopped, and pieces of data may be detected from the first type stream 10 again to restart the playback of the first type stream 10. In this situation, if the playback of the first type stream is impossible, the audio broadcast may be performed again. Alternatively, according to other aspects, processing and reproduction of the first type stream 10 may be attempted according to a predetermined time period.

As described above, according to aspects of the present invention, when normal broadcasting is impossible, audio data corresponding to a broadcast segment following a currently output broadcast segment may be output without a pause. Therefore, it is possible to minimize user inconvenience caused by a broadcast being disconnected.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A digital broadcasting receiver comprising:
   a receiving unit to receive a transport stream comprising a first type stream comprising corresponding audio data and video data, and a second type stream comprising the audio data different in broadcast time from the audio data and the video data in the first type stream; and
   a broadcast output unit to selectively process the first type stream or the second type stream and to output the processed stream,
   wherein the audio data comprised in the first type stream is a same audio data as the audio data comprised in the second type stream other than a difference in the broadcast time,
   wherein the broadcast output unit comprises:
   a storage unit to store the audio data contained in the second type stream;
   a reception signal processor to selectively process the audio data and the video data contained in the first type stream and the stored audio data of the second type stream, and to output the processed data; and
   a control unit to control the reception signal processor to process the audio data stored in the storage unit and to output the processed audio data, when the control unit determines it is not possible for the digital broadcasting receiver to normally output the audio data and the video data in the first type stream, and to control the reception signal processor to process and output the audio data and the video data in the first type stream when the control unit determines it is possible for the digital broadcasting receiver to normally output the audio data and the video data of the first type stream.

2. The digital broadcasting receiver as claimed in claim 1, wherein the control unit checks a level of noise contained in the first type stream to determine whether it is possible to normally output the audio data and the video data in the first type stream.

3. The digital broadcasting receiver as claimed in claim 1, wherein the receiving unit comprises:
   a tuner to receive the transport stream; and
   a demodulator to demodulate the received transport stream received by the tuner and to transfer the first type stream to the reception signal processor and the second type stream to the storage unit.

4. The digital broadcasting receiver as claimed in claim 3, wherein the demodulator checks stream information to classify the first type stream and the second type stream from a packet header within the received transport stream, detects the first type stream and the second type stream separately using the stream information, and demodulates the detected first type stream and the detected second type stream.

5. The digital broadcasting receiver as claimed in claim 1, wherein:
   the broadcast output unit processes the first type stream and outputs the audio data and the video data in the first type stream, when an audio-video mode is set; and
   the broadcast output unit processes the second type stream and outputs the audio data in the second type stream, when an audio mode is set.

6. The digital broadcasting receiver as claimed in claim 1, wherein:

the broadcast output unit processes the first type stream and outputs the audio data and the video data in the first type stream, when an audio-video mode is set; and the broadcast output unit processes the first type stream and outputs the audio data in the first type stream, when an audio mode is set.

7. The digital broadcasting receiver as claimed in claim 1, wherein the second type stream comprises a broadcast segment including first audio data, of the audio data, that is a predetermined number of segments before a corresponding broadcast segment including the first audio data in the first type stream.

8. The digital broadcasting receiver as claimed in claim 1, wherein the received transport stream includes a combination of the first type stream and the second type stream in a composite form for every preset broadcast segment.

9. The digital broadcast receiver as claimed in claim 1, wherein the receiving unit receives first audio data, of the audio data, in the second type stream before receiving the first audio data in the first type stream.

10. A digital broadcasting reception method comprising:

receiving a transport stream comprising a first type stream comprising corresponding audio data and video data, and a second type stream comprising the audio data different in broadcast time from the audio data and the video data in the first type stream; and selectively processing the first type stream or the second type stream and outputting the processed stream, wherein the audio data comprised in the first type stream is a same audio data as the audio data comprised in the second type stream other than a difference in the broadcast time, wherein the processing and outputting of the first type stream or the second type stream comprises:

storing the audio data contained in the second type stream;

determining whether it is possible for the digital broadcasting receiver to normally output the audio and the video data in the first type stream; and selectively processing the audio data and the video data contained in the first type stream and the stored audio data of the second type stream, and outputting the processed audio data and video data when it is determined that it is possible to normally output the audio data and the video data in the first type stream, and processing the stored audio data and outputting the processed audio data when it is determined that it is not possible to normally output the audio data and the video data in the first type stream.

11. The digital broadcasting reception method as claimed in claim 10, wherein the determining of whether it is possible to normally output the audio and the video data in the first type stream comprises checking a level of noise contained in the first type stream to determine whether it is possible to normally output the audio data and the video data in the first type stream.

12. The digital broadcasting reception method as claimed in claim 10, wherein the processing and outputting of the first type stream or the second type stream comprises:

processing the first type stream and outputting the audio data and the video data in the first type stream, when an audio-video mode is set; and processing the second type stream and outputting the audio data in the second type stream, when an audio mode is set.

13. The digital broadcasting reception method as claimed in claim 10, wherein the second type stream comprises a broadcast segment including first audio data, of the audio data, that is a predetermined number of segments before a corresponding broadcast segment including the first audio data in the first type stream.

14. The digital broadcasting reception method as claimed in claim 10, wherein the received transport stream includes a combination of the first type stream and the second type stream in a composite form for every preset broadcast segment.

15. The digital broadcasting reception method as claimed in claim 10, further comprising:

detecting, from the first type stream, audio and video data corresponding to a broadcast segment following a broadcast segment corresponding to the stored audio data; and outputting the detected audio and video data, if playback of the broadcast segment corresponding to the stored audio data is finished.

16. The digital broadcasting reception method as claimed in claim 10, wherein the receiving of the transport stream comprises receiving first audio data, of the audio data, in the second type stream before receiving the first audio data in the first type stream.

* * * * *